United States Patent

[11] 3,575,333

[72] Inventors Frederick W. Kulicke, Jr.
Philadelphia;
Edmund D. Haigler, Hatboro; Albert Soffa,
Wynnewood, Pa.

[21] Appl. No. 777,656
[22] Filed Nov. 21, 1968
[45] Patented Apr. 20, 1971
[73] Assignee Kulicke and Soffa Industries Inc.
Fort-Washington, Pa.

[54] BEAM-LEAD BONDING APPARATUS

17 Claims, 10 Drawing Figs.

[52] U.S. Cl. .................................................... 228/1,
29/470.1, 156/73, 29/471.1, 156/580, 228/4
[51] Int. Cl. ..................................................... B23k 1/06,
B23k 5/20
[50] Field of Search ......................................... 29/470.1,
471.1; 228/1, 4, 5; 310/8.2; 148/12.9; 156/73, 580

[56] References Cited

UNITED STATES PATENTS

| | | | |
|---|---|---|---|
| 3,305,157 | 2/1967 | Pennings ...................... | 228/1 |
| 3,342,395 | 9/1967 | Diepeveen..................... | 228/1 |
| 3,426,951 | 2/1969 | Pohlman ...................... | 228/1 |
| 3,464,102 | 9/1969 | Soloff........................... | 228/1X |
| 3,475,814 | 11/1969 | Santangini.................... | 29/470.1X |
| 3,508,986 | 4/1970 | Berleyoung et al........... | 228/1X |

*Primary Examiner*—John F. Campbell
*Assistant Examiner*—Robert J. Craig
*Attorney*—John B. Sowell

ABSTRACT: An apparatus for alternately or sequentially connecting electrical leads of a beam-lead device to a carrier. A bonding tool is mounted in a housing and is pivoted about a focal point at the working face of the tool to alternately engage the electrical leads connecting the tool and the carrier.

Patented April 20, 1971 3,575,333

3 Sheets-Sheet 1

INVENTORS.
FREDERICK W. KULICKE, JR.
EDMUND D. HAIGLER
ALBERT SOFFA

BY John B. Sowell
ATTORNEY.

INVENTORS.
FREDERICK W. KULICKE, JR.
EDMUND D. HAIGLER
ALBERT SOFFA
BY John B. Sowell
ATTORNEY.

INVENTORS.
FREDERICK W. KULICKE, JR.
EDMUND D. HAIGLER
ALBERT SOFFA
BY John B Sowell
ATTORNEY.

BEAM-LEAD BONDING APPARATUS

BACKGROUND OF THE INVENTION

Most mass produced semiconductor devices are very small and to facilitate their longevity and use are generally mounted on a carrier having external leads adapted to be connected to a circuit system. It has been the practice to connect very fine wires from the electrodes of the semiconductor devices to internal pads or posts of the carrier and to seal the semiconductor device and internal wires into the carrier proper. The wire bonding process of connecting the fine wires from the semiconductor device to the carrier is time consuming and produces a fragile connection to an otherwise extremely rugged and durable device. The beam-lead, sealed-junction integrated circuit semiconductor device was designed to eliminate fine conducting wires. When the beam-lead device is manufactured, it is provided with very small electrical leads extending outward from the top edge of the semiconductor device and having the appearance of small cantilevered beams. It is intended that the pattern of precise beam-leads be connected to a similar pattern of external electrical leads provided on a substrate, printed circuit board or stamped lead frame. To connect the beam-lead device to its carrier it is only necessary to match the pattern of leads one over the other and bond the matching pairs of leads together. One method of bonding a beam-lead device lead to an external electrical lead on a carrier is by thermocompression bonding, however, bonding each lead individually has not proven commercially desirable. Attempts to bond all of the leads simultaneously have not resulted in bonded leads which are as secure and reliable as individually bonded leads. Attempts have been made to sequentially bond the leads of a beam-lead device to a carrier by holding the bonding tool in a vertical axis and moving the base on which the carrier is mounted. Difficulties in constructing such a device have prevented a practical solution.

SUMMARY OF THE INVENTION

Applicant has discovered a beam-lead bonding apparatus which effectively exerts the same conditions of temperature and pressure of each of the leads of a beam-lead device. The carrier is held stationary while all the bonding functions are performed by a movable bonding tool supported in a housing which alternately or sequentially bonds the leads of a beam-lead semiconductor device to a carrier.

Applicant has further discovered that beam-lead bonding tools have a tendency to move the beam-lead device during the bonding operation. Accordingly, there is provided a beam-lead bonding apparatus which locates the beam-lead device precisely over the pattern on the carrier and during the alternate or sequential bonding operation pivots the bonding tool about its own working face so as to maintain the beam-lead device in a fixed location relative to the pattern on the carrier.

DRAWINGS

DESCRIPTION OF THE PREFERRED EMBODIMENT

Figures 1, 2, 3:
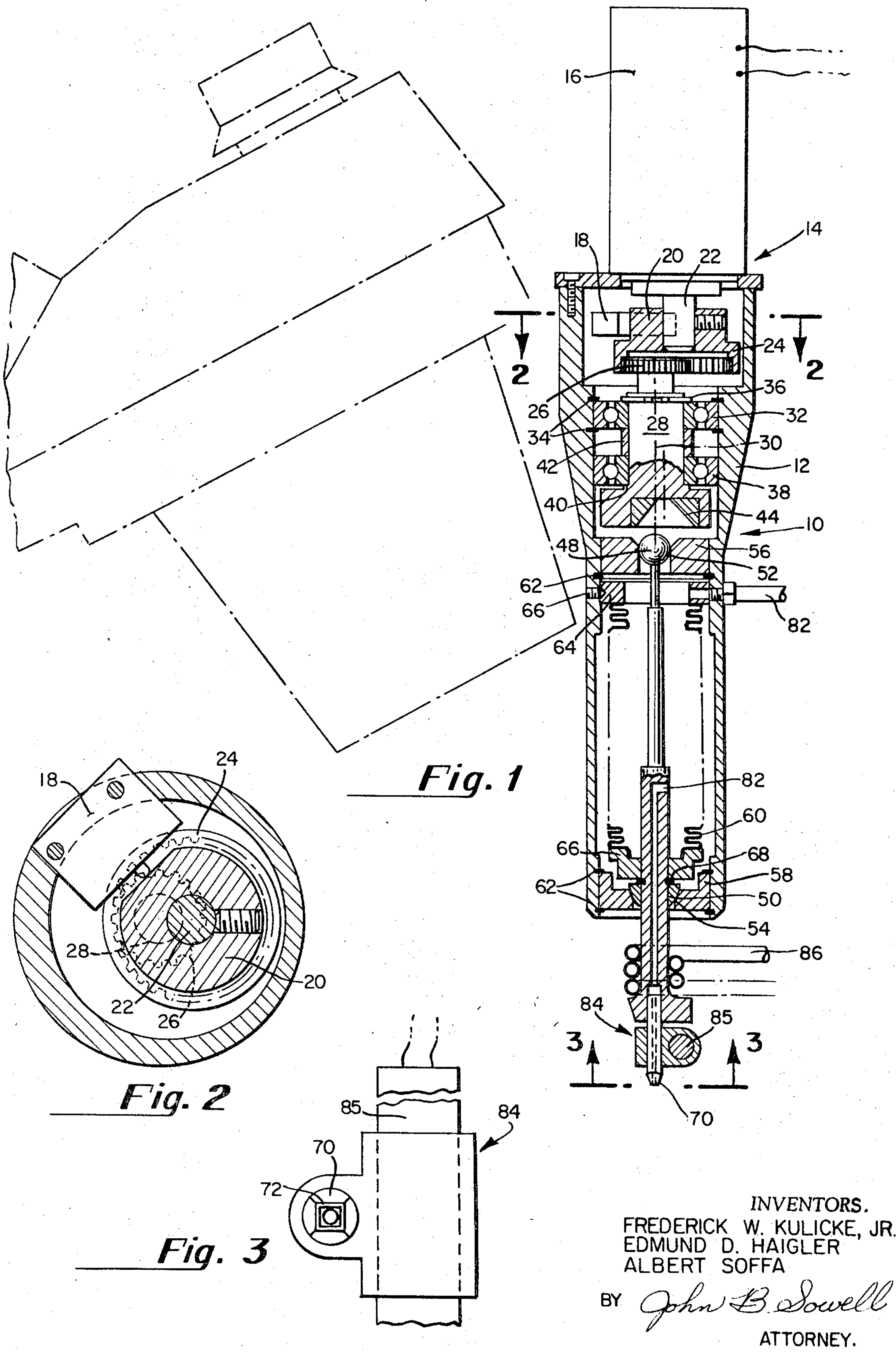
FIG. 1 is an elevation in section of a preferred embodiment bonding apparatus.
FIG. 2 is an enlarged top view section taken at lines 2–2 of FIG. 1.
FIG. 3 is an enlarged bottom view taken at lines 3–3 of FIG. 1 showing the tip of a preferred bonding tool.

The preferred embodiment bonding apparatus 10, shown in FIGS. 1 to 3, comprises a housing 12 which is adapted to be mounted on a vertical slider, not shown, permitting the apparatus to be moved in the vertical Z-direction. Drive means 14 comprising an electric motor 16 is fixedly secured to the housing 12 and adapted by switch 18 and cam 20 on shaft 22 to provide a single revolution of the high torque motor when energized by the motor control (not shown). It will be understood that the motor control starts the motor 16 and after a small amount of rotation of shaft 22, switch 18 is engaged bypassing the motor control and keeping the motor energized until the flat on the cam 20 permits the switch 18 to interrupt the energized motor control circuit.

Shown integral with cam 20 and fixed on shaft 22 is a drive gear 24 having internal teeth in meshing engagement with a pinion 26 on drive shaft 28. Pinion 26 has half the number of teeth as gear 24 so that a single revolution of gear 24 rotates pinion 26 through two complete revolutions. Pinion 26 is fixedly secured to drive shaft 28 which has its rotational axis on the central axis 30 of the housing 10. Upper ball bearing 32 is axially fixed to the housing 10 at its outer race by clip rings 34. Another clip ring 36 is attached to drive shaft 28 and bears on the inner race of upper ball bearing 32. Lower ball bearing 38 is axially fixed relative to drive shaft 28 by a shoulder 40 on the shaft and a spacer sleeve 42 engaging the inner races of ball bearings 32, 38. A recess or cam face 44 in the lower end of drive shaft 28 is located off center or eccentric to the axis 30. The recess or cam face 44, when rotated by motor 16, is driven in a circular orbit about axis 30.

A tool holder 46 is shown in FIG. 1 mounted on the central axis 30 of the housing 10 by upper 48 and lower 50 alignment bearing elements axially fixed on the tool holder. Alignment bearing elements 48, 50 are urged into engagement with complementary alignment surfaces 52, 54 on alignment rings 56, 58 by resilient means 60. Upper alignment ring 56 and lower alignment ring 58 are restrained from movement in the housing 10 by clip rings 62. The upper end of resilient means 60, shown as a thin metallic bellows, is attached to an annular collar 64 fixed by a set screw 66 to the housing 10. The lower end of resilient means 60 is fixed to an annular collar 66 as by being press fitted on holder 46 and further restrained from movement relative thereto by a clip ring 68. The bellows 60 provides compression-spring-bias to urge the tool holder 46 downward, causing the bearing elements 48, 50 to engage their complementary surfaces 52, 54. Bellows 60 is free to bend or fold like an accordion, but prevents the bonding tool holder 46 from rotating on its axis. When the tool holder 46 is in the position shown in FIG. 1, it is not free to move either horizontally or rotationally relative to the housing 10, however, if the tool holder 46 is raised relative to the housing 10, both bearing elements 48, 50 disengage their complementary surfaces 52, 54 and the tool holder is free to move in any predetermined horizontal direction even though restrained rotationally.

Figure 4:
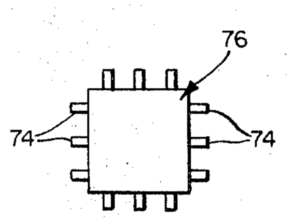
FIG. 4 is an enlarged top view of a beam-lead semiconductor device.

In the lower end of tool holder 46 there is provided a bonding tool 70 having a working face 72 designed to make thermocompression bonds. While the working face 72 is shown best in FIGS. 5 and 6 to have a flat working face and is wedge-shaped in cross section, other bonding tools having different shapes could be inserted in the tool holder 46. It is desired to bond the beam-leads 74 of the beam-lead device 76 (FIG. 4) to the electrical leads or pads 78 on the carrier 80. If the beam-lead device 76 is not prepositioned relative to the carrier 80, the tool 70 is brought into vertical alignment with a beam-lead device 76 by adjustment of a micromanipulator, (not shown) preferably adapted to move the carrier in the X, Y and rotary directions. Preferably means are provided on the carrier support (not shown) to rotate the carrier as well as to provide gross positioning. Once vertically aligned, the tool 70 is provided with vacuum means 82 for picking up the device so that the working face 72 engages the beam-leads 74 but not the device proper 76. The picked up device 76 may now be properly oriented over the pattern on the carrier 80 which matches the pattern of the beam-leads. If the carrier is not located on a heated base, it is desirable that the tool 70 be heated as by heating means 84 having a replaceable cartridge heater 85. It has been found desirable to isolate the heat source 84 and the heated tool 70 from the remainder of the apparatus 10 by the provision of fluid cooled coils 86.

Figure 5:
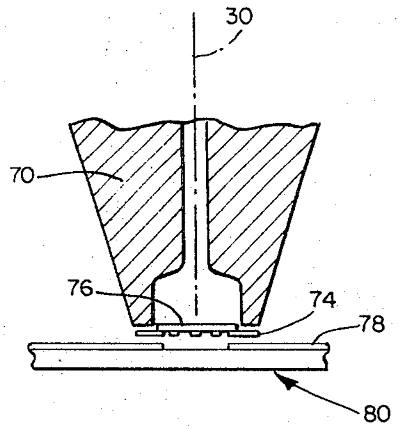
FIG. 5 is an enlarged elevation in section of the bonding tool in position over a beam-lead device prior to the bonding operation.
Figure 6:
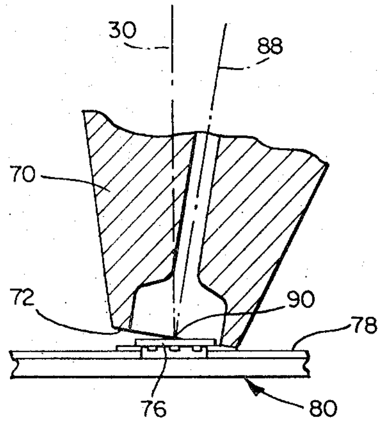
FIG. 6 is an enlarged elevation in section of the bonding tool in position engaging a beam-lead device during a bonding operation.

If the bonding tool 70 is brought into vertical engagement with the beam-leads 74 and the predetermined force then removed, as shown in FIG. 5, not all the beam-leads 74 are bonded to the carrier electrical leads 78 equally well, however, if the bonding tool 70 is tilted, as shown in FIG. 6, the beam-leads 74 along one edge of the device are bonded with approximately equal force. The alignment of the tool relative to the plane of the carrier must be accurate to provide even distribution of force.

The preferred embodiment bonding apparatus 10 is provided with a holder 46 and tool 70 normally vertically aligned on the central axis 30. During a bonding operation the oriented beam-leads 74 are pressed against the circuit pattern 78 on the carrier 80 causing the tool 70 and holder to be raised relative to the housing 10. As the tool holder 46 is raised, the lower bearing element 50 disengages its complementary surface 54 and the upper bearing element 48 disengages its complementary surface 52 to engage the cam face or recess 44, thus, causing the bonding tool 70 to tilt from a position shown in FIG. 5 to the exaggerated position shown in FIG. 6. While the upper bearing element 48 is still engaging the recess 44, the electric motor 16 is energized causing the bonding tool 70 to be driven through two cycles of a wobble motion. As the upper bearing element 48 is moved in a horizontal plane by the circular path of the recess 44, the working face 72 of the bonding tool 70 is walked around the device 76 sequentially exerting a predetermined force on each of the beam-leads 74. As shown in FIG. 6, the intersection of the vertical axis 30 and the tilted axis 88 defines generally a focal point 90 about which the working face 72 of the bonding tool 70 is pivoted. Other motions than circular motion can be imparted to the upper end of the tool holder 46 to produce a motion which alternately and/or sequentially bonds the beam-leads 74 while pivoting about the focal point 90 at the working face 72 of the tool 70.

It will be understood that the apparatus 10 may be counterbalanced to cause the tool 70 to exert a predetermined pressure on the leads 74 of the device 76. If the tool 70 has an annular working face 72, the focal point 90 will remain theoretically fixed relative to device 76; other shapes of working faces 72 will cause the focal point of the tool 70 to rise and fall as the working face 72 walks around the leads. It is this latter condition which occurs in practice, and the ability of the apparatus to adapt to these conditions contributes to its success.

The force placed on the beam-leads 74 of a beam-lead device 76 by apparatus 10 is applied to the housing 12, transferred into the bellows 60, to the tool holder 46 and then to the tool 70. Thus, the complete weight of the apparatus 10 must be counterbalanced rather precisely. The forces applied to the tool are of the order of 50 to 200 grams.

Figure 7:
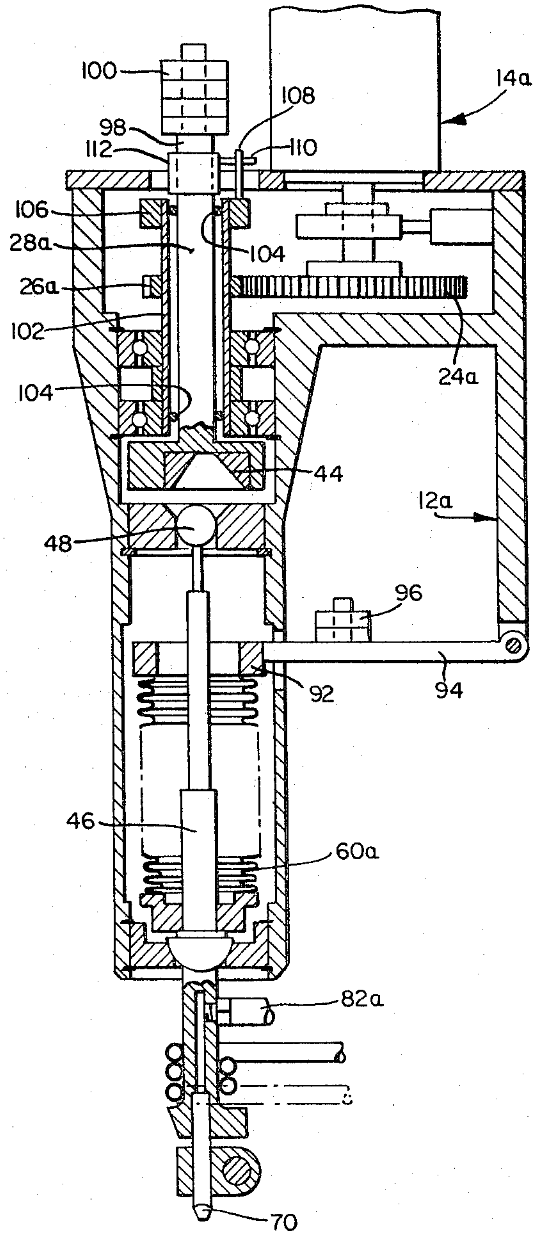
FIG. 7 is an elevation in section of a modification of the preferred embodiment bonding apparatus of FIG. 1.

The modified structure of FIG. 7 embodies a force system capable of placing small predetermined forces directly on the bonding tool 70. The top of bellows 60a is attached to floating ring 92 which is attached to pivot arm 94 pivoted on an extension of the housing 12a. Weights 96 applied to the pivot arm will transfer a constant predetermined force to the bonding tool 70. Since the bellows 60a is open at the top, vacuum means 82 have been connected to the tool holder 46 external of the housing 12a.

Drive shaft 28a extends upward through housing 12a and terminates in a head 98 to which weights 100 or a force system may be applied. Shaft 28a is rotatably mounted in drive sleeve 102 by antifriction rings 104. Sleeve 102 is axially fixed by means, such as clip rings, but free to be rotated by pinion 26a cooperating with gear 24a of drive means 14a. A ring 106 fixed to the top of the sleeve 102 has a pair of pins 108 thereon which extend on both sides of a horizontal drive pin 110 extending outward from a collar 112 fixed on the shaft 28a. It will be understood that pinion 26a turns the sleeve 102 which causes the axially movable shaft 28a to turn. When upper alignment bearing element 48 is in recess 44, the collar 112 is lifted off the sleeve 102, thus, applying the weight of shaft 28a, collar 112 and weights 100 to the tool holder 46. To prevent the bottom of the sleeve 102 from touching the shaft 28a during a bonding operation, suitable stops are provided on the Z-slider to which the housing 12a is mounted. The modified embodiment of FIG. 7 operates according to the same principle as the preferred embodiment, and further provides a low mass system of applying force to the bonding tool 70.

Figure 8:
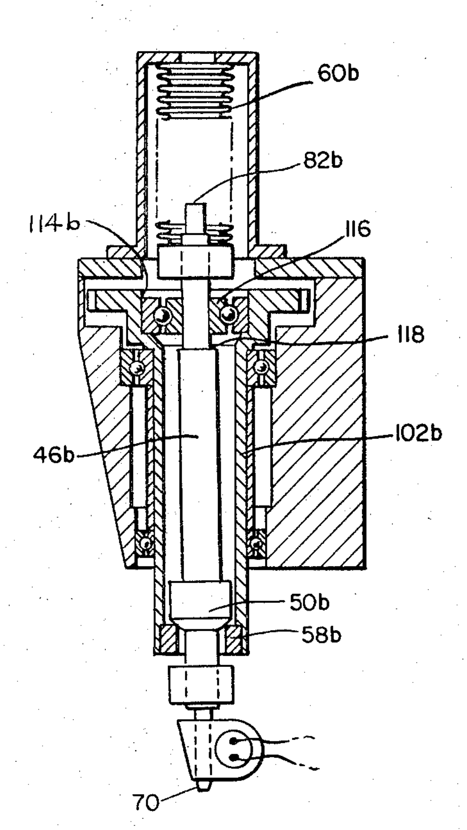
FIG. 8 is an elevation in section illustrating another embodiment of the invention.

FIG. 8 shows a simplified bonding apparatus wherein the force applied to the bonding tool 70 is applied through the housing 12b and bellows 60b to the tool holder 46b. Sleeve 102b is rotatably mounted in the housing 12b. The cylindrical recess 114 in the sleeve 102b is eccentric to the axis of the sleeve 102b, thus, bearing 116 in the recess 114 is driven in a circular orbit so as to maintain tool holder 46b on a permanent tilted axis 88b. Once tool 70 is placed down on a device 76, one or two force system modes are available. If the shoulder 118 on tool holder 46b is engaged upon the bearing 116, the complete force is applied by the bellows 60b and the tool holder 46b. Additional force may be applied by engaging the shoulder 118 with the bearing and applying additional force through the housing 12b. The principle of operation is essentially the same as the preferred embodiment of FIG. 1, wherein the lower alignment bearing 50b is disengaged from its lower alignment ring 58b to enable the tool 70 to be pivoted about its working face 72. The tool holder 46b is prevented from rotating during a bonding cycle by bellows 60b acting as universal joint or coupling between the housing and the tool holder.

Figure 9:
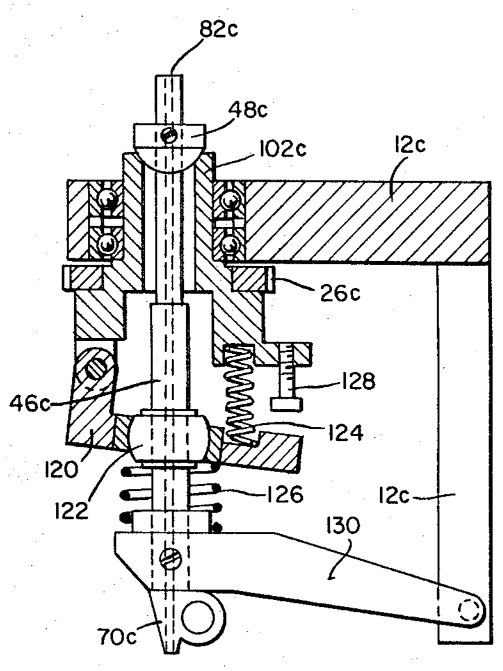
FIG. 9 is an elevation in section illustrating a third embodiment of the invention.

FIG. 9 shows an inverted sleeve 102c which supports the pinion 26c and further has a lever arm 120 pivotally mounted thereon. A bearing element 122 is pivotally mounted in the lever arm 120 and may be axially fixed on the tool holder 46c by clip rings. In the position shown in FIG. 9, the bearing element 122 acts to vertically align tool holder 46c in the sleeve 102c. When tool 70c is pressed on a device 76, the upper alignment bearing element 48c lifts free to to move laterally and lever arm 120 pivots to tilt the tool holder 46c on a tilted axis 88c (not shown). While on a tilted axis, sleeve 102c is rotated, causing tool 70c to pivot about its working face or to walk around the leads 74 of the beam-lead device 76. Spring 124 urges lever arm 120 to its normal position, but is overcome by spring 126 when tool 70c is forced downward onto a device 76. When lever arm 120 engages stop 128, force is applied through the stop 128 as well as the springs 124, 126 to the tool holder 46c. A cantilevered arm 130 is fixed to tool holder 46c and cooperates with an extension on the housing 12c to prevent rotation or turning of the tool 70 and tool holder 46c.

All of the tools explained thus far have operated upon the principle of placing the working face 72 of the bonding tool 70 on a beam-lead device 76 to move the tool 70 upwards relative to the housing 12, thus, permitting the drive means 14, remote from the working face 72, to move the tool 70 through a predetermined path while the working face 72 becomes the pivot point for operation of the tool. Having explained the apparatus 10 and its mode of operation it will be understood that the portion of the working face 72 in contact with the leads 74 becomes the instantaneous focal point for movement of the bonding tool. Since the tool holder is preferably tilted less than 3° the component of force attempting to cause the bonding tool 70 to move laterally is so small as to be negligible. Devices of the type having a fixed focal point at the working face 72 of the bonding tool 70 do not cause "skate" or lateral movement of the device 76 being bonded, however, the extreme accuracy required to build a true fixed focal point device immune to dimensional changes due to thermal change has been difficult to achieve.

Figure 10:
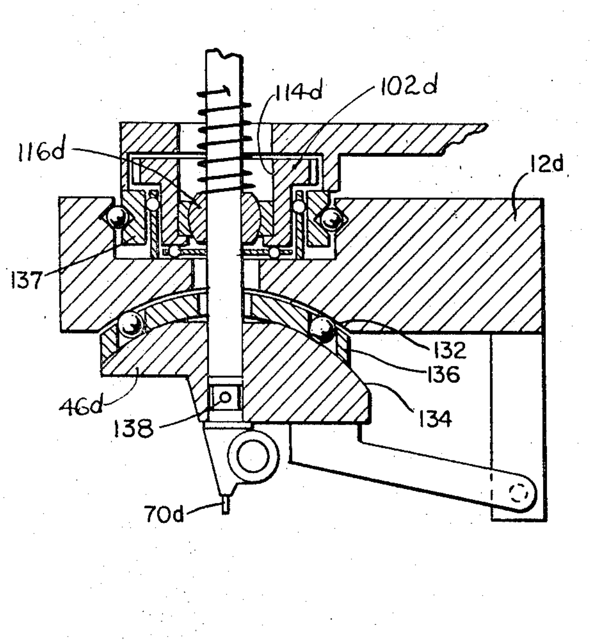
FIG. 10 is an elevation in section illustrating a fourth embodiment of the invention.

FIG. 10 shows an apparatus adapted to maintain the working face **72*d* of the bonding tool 70*d* on a fixed focal point 90*d* (not shown). Housing 12*d* is provided with a spherical-shaped surface 132; a similar surface 134 on the tool holder 46*d* is disposed opposite thereto and separated by bearing means 136. Means (not shown) are provided to urge the tool holder surface 134 toward the housing surface 132. Sleeve 102*d* is mounted in a slider 137 which is movable away from the viewer. The cylindrical recess 114*d* in the sleeve is eccentric to or off center of the rotational axis of the sleeve 102*d*. Bearing 116*d* is mounted in the eccentrically located recess 114*d* so that rotation of the sleeve will cause the bearing 116*d* to be driven in a circular path concentric to the vertical axis. Movement of the slider permits the normally tilted tool holder 46*d* to be vertically aligned for pickup and placement operation on a device 76, and permits the device to be tilted for a bonding operation. It will be understood that focal point 90*d* is a function of the radii of surfaces 132, 134, and that the preferred focal point 90*d* will be in the plane of the working face 72 of the tool 70, as described with reference to FIG. 6 heretofore. In order to accurately obtain the fixed focal point 90*d*, the tool 70 should be axially adjustable relative to the tool holder as by means of a set screw 138**.

Having explained the preferred embodiment, its modifications and alternative features, the advantages should be apparent. The apparatus being self-contained, small and light is easily mounted on a Z-slider. A micromanipulator supporting the carrier enables the apparatus to be quickly and accurately centered over a beam-lead device 76. A preferred mode of operation is to engage the working face 72 of the bonding tool 70 with the leads 74 of the device 76 without touching the device with the working face of the tool 70. Since the devices being picked up are usually on a dish in random array, means for rotating the device relative to the bonding tool are provided such as means for rotating the tool, the dish or the base supporting the dish. After picking up a device 76 by vacuum means 82, the device 76 may be moved to the carrier 80 or the movements reversed. Since the tool 70 is in a vertical or substantially vertical position, it can readily be brought into position over the pattern 78 on the carrier 80 and the bonding operation performed by energizing the drive means 14. Although the drive means 14 illustrated moves the end of the tool holder 46 in an orbital or circular path, a rocking motion, cross path motion or various geometrical motions may be obtained. Such possible applications and other modifications are intended to be covered by the following claims.

We claim:

1. A bonding apparatus for bonding leads of a beam-lead device to a pattern of conductors on a carrier comprising:
   - a housing;
   - a tool holder mounted on the housing for movement relative thereto;
   - a bonding tool attached to one end of the tool holder in axial alignment therewith;
   - a working face on said bonding tool for engaging the leads of the beam-lead device, said working face being in a plane normal to the axis of the tool and tool holder; and
   - drive means mounted on the housing engaging the tool holder remote from the bonding tool end for moving the tool holder on a tilted axis causing the working face of the bonding tool to alternately engage and bond leads of the beam-lead device to the conductors on a carrier.

2. A bonding apparatus as set forth in claim 1, which further includes at least two alignment bearing elements on the tool holder in spaced-apart relationship for positioning the tool holder relative to the housing.

3. A bonding apparatus as set forth in claim 2, wherein one of said bearing elements engages the drive means when the tool holder and bonding tool is on the tilted axis.

4. A bonding apparatus as set forth in claim 3, wherein the other bearing element is freely disengaged from the housing when the tool holder and bonding tool are on the tilted axis.

5. A bonding apparatus as set forth in claim 4, wherein axial movement of the bonding tool, tool holder and alignment bearing elements into the housing acts to disengage the other bearing element from the housing, said drive means further comprising means for moving the bonding tool and tool holder from a vertical axis to a tilted axis.

6. A bonding apparatus as set forth in claim 5, wherein the means for moving the bonding tool and tool holder from a vertical axis to a tilted axis comprises a lever arm pivotally mounted on the drive means.

7. A bonding apparatus as set forth in claim 5, wherein the means for moving the bonding tool and tool holder from a vertical axis to a tilted axis comprises a cam face on the drive means.

8. A bonding apparatus as set forth in claim 5, wherein the means for moving the bonding tool and tool holder from a vertical axis to a tilted axis is rotatably movable by the drive means in a circular orbit to cause the working face of the bonding tool to sequentially engage the leads of a beam-lead device.

9. A bonding apparatus for bonding leads of a beam-lead device as set forth in claim 2, wherein the working face of the bonding tool is pressed upon the leads of a beam-lead device to free the two alignment bearings from engagement with the housing and to engage one of said bearing elements with said drive means, whereby movement of said tool holder by said drive means pivots the bonding tool about a focal point at its own working face.

10. A bonding apparatus for bonding leads of a beam-lead device to a pattern of conductors on a carrier comprising:
    - a housing mounted on a base opposite a carrier on a work station to provide X, Y, Z and rotary movements relative thereto;
    - a tool holder supported in the housing and adapted to be moved relative to the housing and the carrier;
    - a bonding tool attached to one end of the tool holder and having a working face for engaging the leads of a beam-lead device;
    - a torsional restraint connected to said tool holder for preventing rotational movement of said bonding tool and said tool holder relative to said housing; and
    - drive means cooperating with said tool holder to move the end of the tool holder remote from the bonding tool in the housing while the working face of the bonding tool is engaging the leads of a beam-lead device on a pattern of conductors on a carrier whereby the force of the bonding tool exerts progressively distributed pressure on the leads of the beam-lead device.

11. A bonding apparatus as set forth in claim 10, which further includes a pair of alignment bearing elements on said tool holder for normally aligning and supporting said tool holder in the housing.

12. A bonding apparatus as set forth in claim 11, wherein said pair of alignment bearing elements are normally urged into engagement with said housing by resilient means.

13. A bonding apparatus as set forth in claim 12, wherein said torsional restraint comprises a metallic bellows.

14. A bonding apparatus as set forth in claim 13, wherein said torsional restraint further comprises a pivot arm connected to the housing.

15. A bonding apparatus as set forth in claim 14, wherein said torsional restraint further comprises means for exerting a predetermined force on the bonding tool.

16. A bonding apparatus as set forth in claim 15, wherein said drive means comprises a weighted shaft for exerting a predetermined force on the bonding tool.

17. A bonding tool apparatus for bonding leads of a beam-lead device to a pattern of conductors on a carrier comprising:

a housing arranged for movement relative to a carrier;

a tool holder supported by said housing and restrained from rotational, downward and lateral movements by restraining means on the tool holder;

a tool on said tool holder having a working face engageable with the leads of a beam-lead device to disengage said tool holder from said housing leaving the tool rotationally restrained but free to pivot about its working face; and drive means on said housing engaging said tool holder for pivoting said tool about its working face to bond the leads of the beam-lead device to the conductors on the carrier.